May 17, 1966   H. E. STRECKER   3,251,534
COMPRESSOR CONTROL SYSTEM
Filed March 4, 1963   3 Sheets-Sheet 1

INVENTOR.
Hubert E. Strecker
BY
Fishburn and Gold
ATTORNEYS

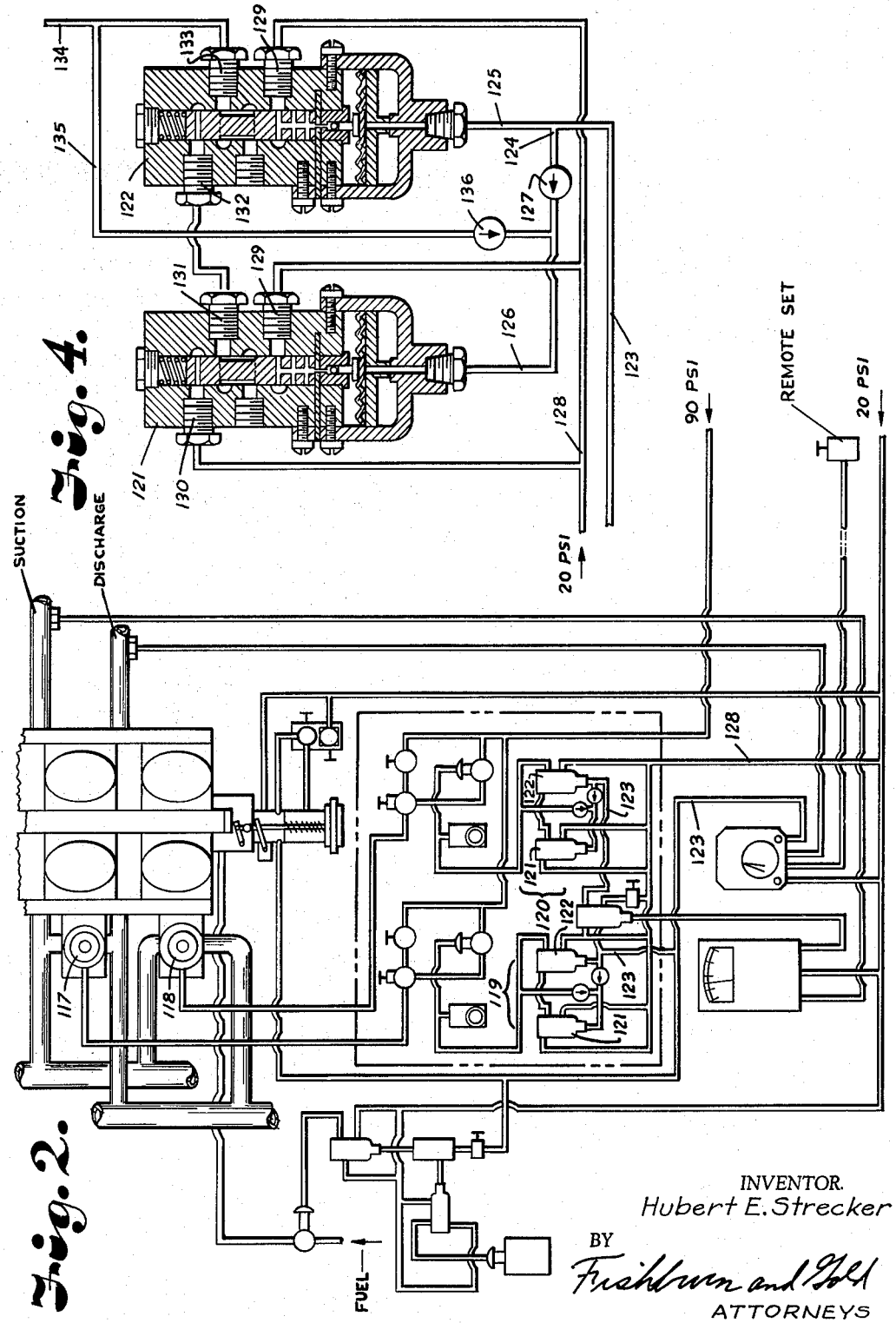

May 17, 1966  H. E. STRECKER  3,251,534
COMPRESSOR CONTROL SYSTEM
Filed March 4, 1963  3 Sheets-Sheet 3

INVENTOR.
Hubert E. Strecker
BY
Fishburn and Gold
ATTORNEYS

United States Patent Office 3,251,534
Patented May 17, 1966

3,251,534
COMPRESSOR CONTROL SYSTEM
Hubert E. Strecker, Liberal, Kans., assignor to Panhandle Eastern Pipe Line Company, Inc., Kansas City, Mo., a corporation of Delaware
Filed Mar. 4, 1963, Ser. No. 262,664
7 Claims. (Cl. 230—2)

This invention relates to automatic control systems and more particularly to an improved system of this type for automatically coordinating several control parameters to obtain desired operation.

In pumping plants having a varying output demand it is common to automatically control pump speed for obtaining desired output rate. With regard to such installations having multiple pumps it is also known that output rate can be varied by inactivating or activating selected pumps in a pump group or the prime movers driving such pumps.

In many operations, and particularly with respect to long distance gas pumping through pipe lines, remote pumping or booster stations usually contain several large stationary internal combustion engines of the type able to develop an output in the order of one thousand horsepower. Such engines are commonly arranged so that each drives a plurality (for Example 6) compressor cylinders. To obtain efficient fuel consumption rates and long life in such engines they must be operated, if at all, within a narrow speed range and load range.

In complying with variations in output pressure demand from such stations it is often necessary to, (1) shut down or start up selected engines to provide for large variations, (2) inactivate (unload) or activate particular compressor cylinders on operating engines to correct for intermediate variations, and (3) alter engine speed within a narrow characteristically efficient range to induce minor variations. Although devices are known for individually controlling engine shut down, compressor cylinder unloading, and engine speed, proper coordination for overall desirable operation has heretofore been through substantially manual means.

The principal objects of the present invention are: to provide an automatic control system adapted to properly coordinate several control parameters for producing efficient pumping plant operation consonant with demand; to provide such a control system which selects a desirable combination of operating conditions and executes an order therefor quickly and efficiently; to provide such control apparatus which is adapted to receive orders for producing output variations from locations greatly remote therefrom; to provide a flexible integrated automatic control system which offers an infinite number of control parameter combinations so as to produce substantially exact demand output even though certain of the control parameters involve step functions; to provide such a control system which may receive orders locally as well as from remote locations and includes manual overriding features; to provide such an automatic system which contains automatic unloading devices which are sensitive to apparatus overload conditions; to provide such a control system which is simple in design and requires only relatively standardized components; to provide such a system which is easily calibrated and maintained, and to provide such a system which is highly flexible for use in many types of apparatus.

A further important object of this invention is to provide such a system which has the ability to pass over a particular control function in case of an equipment failure without altering the proper sequencing of other control functions or producing output error.

Other objects and advantages of this invention will become apparent from the following description taken in connection with the accompanying drawings wherein are set forth by way of illustration and example certain embodiments of this invention.

FIG. 2 is a circuit diagrammatic view illustrating a modified form of the control system of FIG. 1.

FIG. 4 is a partially diagrammatic cross-sectional view on an enlarged scale showing a pneumatic relay assembly used with the embodiment of FIG. 2.

Figure 1:
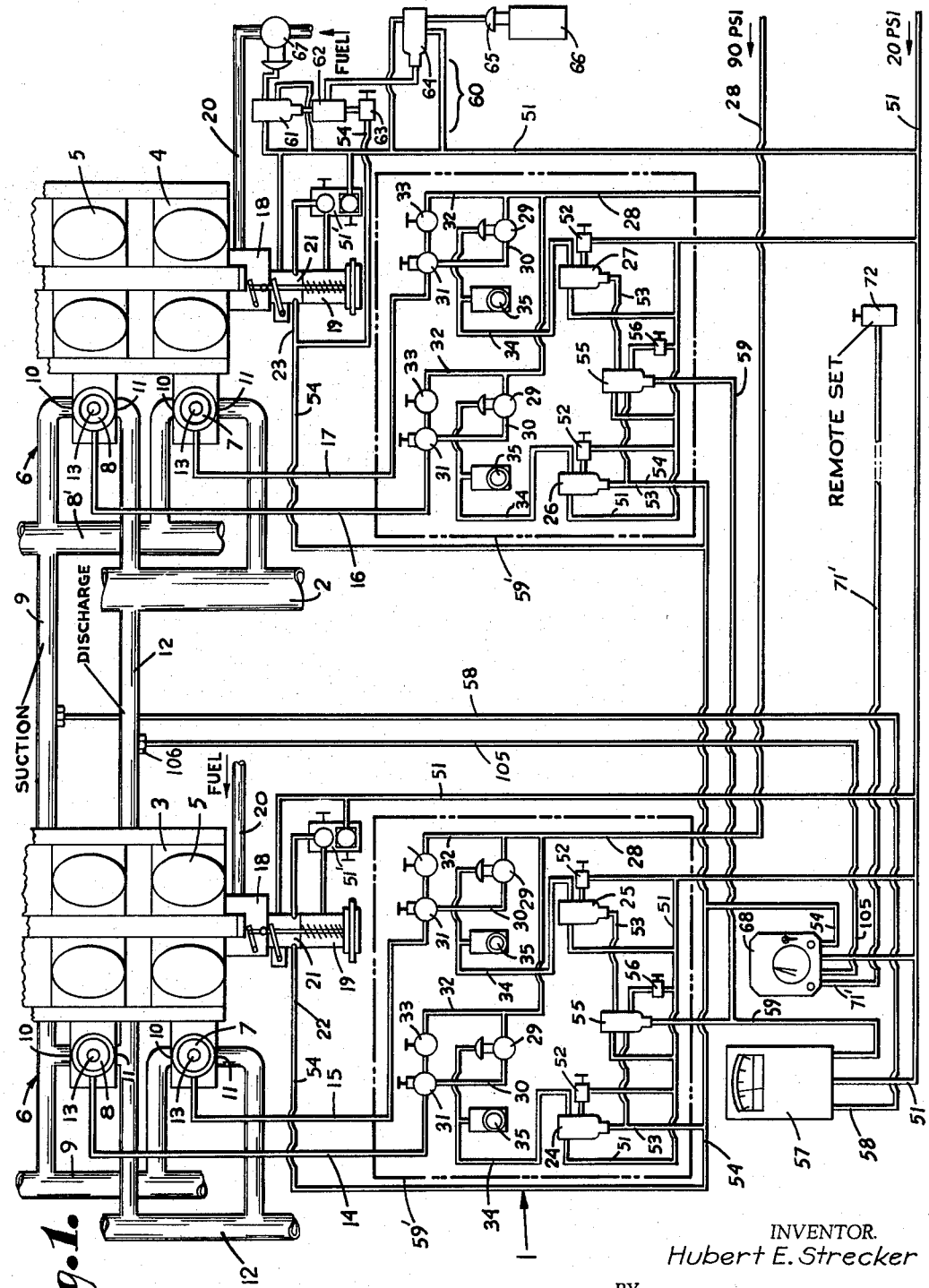
FIG. 1 is a circuit diagrammatic view illustrating an automatic control system embodying this invention for maintaining a desired discharge line pressure from a gas pipeline pumping station.

Referring to the drawings in more detail:

The reference numeral 1 (FIG. 1) generally indicates an automatic control system embodying this invention. The system 1 is adapted to coordinate control parameters discussed hereinafter for maintaining a desired pressure in the discharge line 2 of a gas pipeline pumping station which includes a plurality of speed controllable internal combustion engines, numbering two for the purposes of illustration, and respectively indicated by the reference numerals 3 and 4. The engines 3 and 4 each include a plurality of diagrammatically illustrated combustion cylinders 5 within which are located pistons (not shown) operably connected by conventional power-train members (not shown) to compressors broadly designated 6. The compressors 6 each include banks having multiple compressor cylinders only two of which are shown per compressor and designated 7 and 8. It is to be understood however, that additional cylinders form a part of each compressor 6, as noted below, and are driven by the respective engines.

The gas being pumped by the station arrives through a suitable supply source such as a suction pipe 8' which divides into a suction manifold 9 forming the input 10 to the respective compressor cylinders. The output 11 of the compressor cylinders is directed into a discharge manifold 12 which feeds the station discharge line 2.

The compressor cylinders 7 and 8 each include remotely operable unloading devices 13 of a conventional nature commonly known as "valve lifters" or "pneumatic clearance bottles" and operable to selectively unload or render inoperative a compressor cylinder without physical disengagement from the engine. Such unloading devices are manufactured, for example, by the Cooper Bessemer Corp. The unloading devices 13 are respectively driven into cylinder load and unload position through pressure changes in pneumatic lines 14, 15, 16 and 17 fed by devices described hereinafter, however driving power may be obtained by other means such as electricity without departing from the scope of this invention.

A conventional speed control governor 18 is operably associated with each of the engines and a diaphragm motor 19 is adapted to provide the motive force for setting the governor 18 to a particular position corresponding to desired engine speed. The engines receive fuel during operation through suitable fuel lines 20, in the illustrated example, the fuel being gas tapped from the gas pipeline.

The engines are of the large stationary type which characteristically operate efficiently only within a limited speed and load range. For illustration it is assumed that the engines must be restricted to a minimum speed of 290 r.p.m. and a maximum speed of 310 r.p.m. and a load not exceeding 1000 horsepower or being less than 600 horsepower. It is further assumed that each engine drives six compressor cylinders and each compressor cylinder represents a load of 200 horsepower at efficient engine speed. Thus, it is clear that each engine can tolerate the unloading of only two compressor cylinders and continue to operate properly. If discharge pressure exceeds demand when an engine is running at 290 r.p.m. with two cylinders unloaded it becomes necessary to completely shut down the engine and allow the slack to be taken up by another engine (or engines).

Positioning members or valve positioners 21 are operably connected to and control the respective governors 18 and diaphragm motors 19 and are adapted to respond only within a predetermined limited pressure range as sensed in respective pneumatic lines 22 and 23 for varying engine speed between the fixed limits noted above. The valve positioners 21 may take the form of any several known types, for example, a Foxboro Type C Valvactor which is set to respond to variations in a signal pressure range of from nine to twelve p.s.i. corresponding, in reverse proportion to an engine speed range of 310 to 290 r.p.m., however direct proportion may be used in other applications without departing from the scope of this invention. Below nine p.s.i. and above twelve p.s.i. the valve positioners 21 maintain the engines operating at the respective maximum and minimum speeds.

Pneumatic relay assemblies 24, 25, 26 and 27 described hereinafter are respectively operably associated with and control the cylinder unloading devices 13 through apparatus now described. A high pressure supply line 28 for example, 90 p.s.i., branches to one side or input of a diaphragm operated valve 29 furnished for each unloading device 13. The output 30 of the valves 29 is directed through manually operated selector valves 31 to the respective unloader control lines 14, 15, 16 and 17. Pneumatic bypass lines 32 communicate with the high pressure supply line 28 through manually operated load and unload valves 33 to the selector valves 31 for manually bypassing the diaphragm operated valves 29 when desired.

Pneumatic lines 34 carry pressure signals for actuating the diaphragm operated valves 29, the lines 34 also communicating with suitable pneumatic indicating devices 35 to provide a visual indication of the loaded or unloaded condition of the respective unloading device 13. The pneumatic lines 34 communicate with the output port 36 of the respective pneumatic relay assemblies 24, 25, 26 and 27, an example of said relay assemblies being illustrated on a larger scale in FIG. 3.

Figure 3:
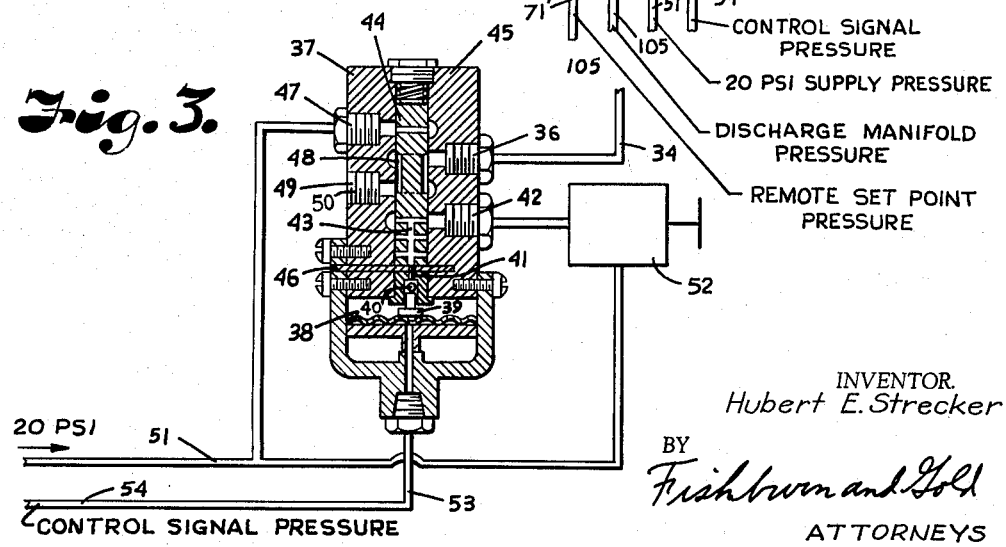
FIG. 3 is a partially diagrammatic cross-sectional view on an enlarged scale showing a pneumatic relay assembly used with the embodiment of FIG. 1.

Referring particularly to FIG. 3, the pneumatic relay assemblies 24, 25, 26 and 27 comprises a device 37 of the type known as a Taylor Adjustable Pneumatic Pilot having a bellows diaphragm 38 which, when expanded, displaces a pin 39 for urging a ball 40 against a bleed orifice or passageway 41 for blocking air which would otherwise pass therethrough and escape. Air is directed into a supply port 42 which communicates with the bleed passageway 41 through passageways 43 formed in the lower part of a longitudinally reciprocal plunger 44. When the diaphragm 38 is deflated air freely bleeds through the passageway 41 and a spring 45 urges the plunger 44 downwardly against a stop 46 seating or reseating the plunger. When the diaphragm 38 is inflated however, the bleed passageway 41 becomes partially or completely blocked which traps the supply air beneath the plunger 44 causing it to rise against the spring 45 tripping the plunger. The rising or tripping of the plunger 44 produces communication between an input port 47 and the output port 36 which normally do not communicate, the communicating passageway being provided by a necked down portion 48 intermediate the ends of the plunger. A port 49 which communicates with the output port 36 during plunger reseating presents a vent opening 50 for selectively dropping pressure in the respective line 34.

A low pressure supply line 51, for example 20 p.s.i., provides operating pressure for the speed control governor 18 and driving pressure for the diaphragm motor 19. A manually operated selector valve and regulator 51' between the supply line 51 and the diaphragm motor 19 and valve positioner 21 permits manual engine speed control if desired. The supply line 51 also communicates with the pneumatic relay assemblies 24, 25, 26 and 27 at the ports 47 thereof and in addition at the ports 42 through a needle valve 52. The needle valve 52 cooperates with the device 37 to accurately control the bleed rate past the ball 40 for greatly expanding the required spread between the required upper and lower pressures acting on the bellows diaphragm 38 to cause tripping and reseating of the plunger 44. The greater the flow through the needle valve 52 the greater the pressure difference or span required in the bellows diaphragm 38 for relay operation.

In conforming with the illustrated example, i.e., with the valve positioners 21 operative within the range between 9 and 12 p.s.i., it is assumed that pneumatic relay assembly 24 is set to trip at 12 p.s.i. and reseat at 9 p.s.i.; relay assembly 26 is set to trip at 13 p.s.i. and reseat at 8 p.s.i.; relay assembly 25 is set to trip at 14 p.s.i. and reseat at 7 p.s.i.; and relay assembly 27 is adapted to trip at 15 p.s.i. and reseat at 6 p.s.i. Note that the tripping signal pressures for each assembly 24, 25, 26 and 27 vary from each other but are within a range above the operating range of the valve positioners 21 and the reseating pressures are each different from each other but with a range below the operating range of the valve positioners. The unloading devices 13 load the respective compressor cylinder when the respective relay reseats and unloads the compressor cylinder when the relay assembly trips. The pneumatic relay assemblies receive operating signal pressures from respective pneumatic lines 53 all communicating directly or indirectly with the signal pressure output line 54 of a master controller described hereinafter.

The pneumatic lines 53 of the pneumatic relay assemblies 25 and 27 communicate with the signal pressure output line 54 through pneumatic relay assemblies 55 similar to the relay assemblies 24, 25, 26 and 27 and having needle valves 56 communicating with the low pressure supply line 51 for the same purpose. A suction pressure transmitter 57 of any known type, an example being Foxboro Pressure Transmitter, Series B, obtains an air supply from the low pressure supply line 51 and communicates through a suitable pneumatic line 58 with the suction manifold 9 to sense suction pressure therein and transmit a pressure signal proportional thereto. The pressure signal or output of the suction pressure transmitter 57 is fed into a line 59 which controls the operation of the pneumatic relay assemblies 55. Overloading of the respective engines may be sensed by the relay assemblies 55 as a critical pressure level in the transmitter 57 output. The relay assemblies 55, when tripped, remove the relays 25 and 27 from the signal output line 54 and connect supply pressure thereto to insure a tripped condition of the relays 25 and 27 which means that the associated compressor cylinders are unloaded. The relay assemblies 55 are set to reseat when the critical pressure in the transmitter 57 output no longer exists. Thus, the pneumatic relay assemblies 55 are able to override the controls of one unloader device (or more if desired) per engine, the particular tripping and reseating pressures thereof being individually determined by the characteristics of each compressor.

The broken lines 59' enclose convenient groupings of control members for installation adjacent engines.

An engine shut down control is broadly designated 60 and is illustrated as operably associated with engine 4, however, similar shut down controls may be associated with other engines in the same manner without departing from the scope of this invention. The engine shut down control 60 includes a pneumatic relay assembly 61 which communicates through a volume (time delay) bottle 62 and needle valve 63 with the signal pressure output line 54. The pneumatic relay assembly 61 is similar to the relay assemblies 24, 25, 26 and 27 except that it has no needle valve in the supply line for spreading the tripping and reseating pressures and therefore the pneumatic relay assembly 61 trips and reseats within a narrow range, in the order of a ½ p.s.i. spread. The relay assembly 61 is adapted to trip, following a time delay caused by the bottle 62 for smoothing out transient pressures, when the pressure in the signal pressure output line 54 reaches a pressure of 16 p.s.i., that is, just above the pressures at which relay assemblies 24, 25, 26 and 27 have tripped to unload the compressor cylinders associated therewith. As noted hereafter the tripping of the relay assembly 61 shuts down the engine 4.

Also included in the shut down control 60 is a pneumatic relay assembly 64 similar to the relay assembly 61 and communicating with the volume time delay bottle 62. The relay assembly 64 is adjusted to seat or reseat at 5 p.s.i., just below the seating pressures of pneumatic relay assemblies 24, 25, 26 and 27 for sending an operating signal to the start button 65 on an engine sequence starting panel 66. It is to be understood that in cases where an engine sequence starting panel is not available the pneumatic relay assembly 64 will not be present and the engine must be restarted by conventional sequential steps manually performed. The usual steps which must be performed in starting large gas fired engines of the above type are: start lubrication pump; admit starting air; turn on ignition; turn on fuel gas and turn off starting air; idle engine for warm-up; increase engine speed; open discharge valve; close by-pass valve; and open suction valve. Starting panels for automatically performing these steps are available from many sources such as the Cooper-Bessemer Corporation, Clark Bros. Company and Ingersoll-Rand Company.

If shut down controls such as 60 are provided on other engines in the pumping station they will preferably be adjusted so as to trip and reseat at pressures different from each other but outside the tripping and reseating ranges of the unloader controls so as to shut down or start up the various engines in desired sequence according to discharge demand.

In the illustrated example, the tripping of the relay assembly 61 permits supply pressure from the low pressure supply line 51 to enter a diaphragm-operated valve 67 in the fuel line 20 leading to engine 4 for cutting off the flow of fuel into the engine. The engine sequence starting panel 66 also controls fuel flow into the respective engine but through conventional control valves not shown.

Figure 5:
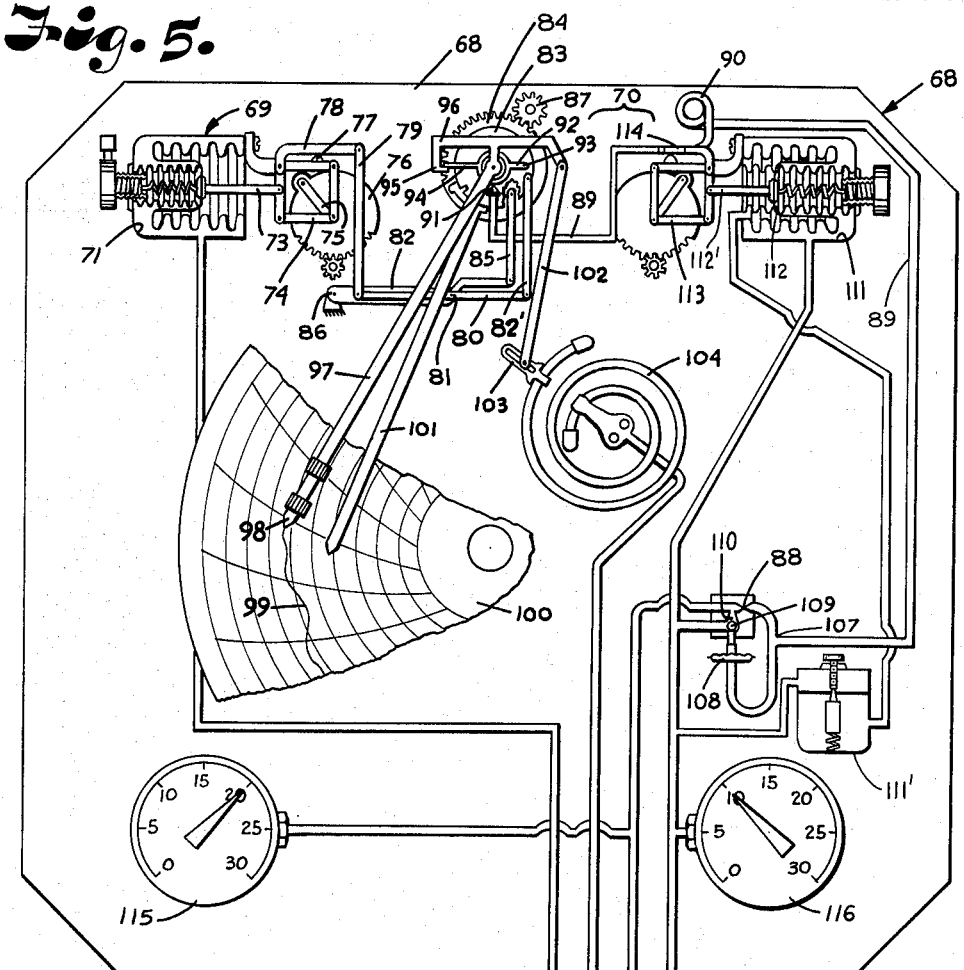
FIG. 5 is a fragmentary partially diagrammatic view on an enlarged scale showing a master controller forming a part of the control system and including remote setting features.

The pressure in the signal line 54 is controlled by a master controller 68. The master controller 68 is of a known type, an example of which is the Taylor Fulscope Controller with remote pneumatic adjustment available from the Taylor Instrument Co. Referring particularly to FIG. 5, the master controller 68 comprises a remote set point device 69 and controller portion 70. The remote set point device 69 includes a bellows system 71 communicating with a line 71' terminating at some remote point, for example several thousand feet distant, in a regulated and controlled pressure source 72 by which station output demand signals may be fed into the master controller. A signal transmitted by wire or radio may be used for greater distance remote control, in which case the pressure source 72 is varied thereby. A pressure change in the line 71' which constitutes a coded demand for a change in station output pressure, is reflected through the bellows system 71 in an axial movement of a rod 73. The rod 73 is pivoted to a parallelogram arm linkage 74 which moves a proportional distance as determined by the adjusted position of an adjusting arm 75 pivoted to a sensitivity adjusting circular gear segment 76. The motion of the parallelogram linkage 74 causes a vertical motion of a bumper 77 engaging an arm 78 pivotally connected to a substantially vertically extending arm 79. The arm 79 is pivotally connected at the lower end thereof to a crank 80 which is pivoted intermediate the ends thereof at 81 to an arm 82. The crank 80 is pivotally connected at the end thereof opposite the arm 79 with an arm 82' pivotally connected to a floating gear 83. It can thus be seen that an axial motion of the rod 73 may result in a rotational adjustment of the floating gear 83.

A back gear 84 pivotally supports an arm 85 which is pivoted to one end of the arm 82, the other end of which is pivotally anchored at 86. By rotating the back gear 84 through a small angle by means of a meshing adjusting gear 87, the position of the pivotal connection at 81 may be altered for adjusting the desired zero position of the floating gear 83.

Referring more particularly to the controller portion 70, air in the low pressure supply line 51 is fed through a flow restricting orifice 88 into a tube 89 which loops at 90 and terminates in a bleed nozzle 91. The bleed nozzle 91 is located closely adjacent a ring baffle member 92 which is pivotally mounted at 93 to the floating gear 83. The ring baffle member 92 has an arm extension 94 opposite the pivotal mounting at 93 which rests upon the inwardly extending foot 95 of a T-shaped member 96 pivotally mounted on an axle extending with considerable clearance through the ring baffle member 92. The T-shaped member 96 includes an elongated extension 97 terminating in a chart pen 98 which is adapted to write an indicating line 99 on a conventional record chart 100 which is driven by a suitable timing clock motor (not shown). An elongated extension arm 101 is suitably fixed with respect to the floating gear 83 and constitutes a pointer to visually reflect on the chart 100 the current order for station discharge pressure in the line 71'.

The T-shaped member 96 at the end opposite from the foot 95 is pivotally connected to an arm 102 which is engaged by means of a slotted adjusting member 103 with a Bourdon gauge tube 104. The gauge tube 104 communicates with a pressure line 105 terminating in a connection 106 on the discharge manifold 12 for monitoring or responding to station discharge pressure.

The tube 89 feeding the bleed nozzle 91 is teed-off at 107 and directed to a diaphragm bellows member 108 adapted to respond to pressures therein for vertically displacing a ball 109 toward and away from a valve seat 110 through which is fed low pressure air from the supply line 51. Air escaping past the ball 109 is directed into the signal pressure output line 54 which communicates directly with a back bellows system 111 and through a needle valve 111' to a front or reset bellows system 112. Variations of pressure in the back bellows system 111 and the front bellows system 112 result in longitudinal displacement of a rod 112' pivotally connected to a parallelogram linkage 113 similar to the linkage 74 noted above. The output arm 114 of the parallelogram linkage 113 is tied to the tube 89 slightly downstream from the loops at 90 whereby the longitudinal displacement of the rod 112' results in a vertical displacement of the bleed nozzle 91 toward and away from the ring baffle member 92.

In operation of the controller portion 70, the close proximity of the ring baffle member 92 to the bleed nozzle 91 restricts the bleed rate through the nozzle 91 which causes a pressure increase in the tube 89 which is, in turn, reflected in a raising of the ball 109 toward the valve seat 110. This restricts the flow of air from the low pressure supply line 51 into the signal pressure output line 54, permitting a drop of pressure in the line 54 which is immediately reflected in the back bellows system 111 to move the rod 112' longitudinally to the right which causes a slight lowering of the bleed nozzle 91 with respect to the ring baffle member 92, the nozzle seeking a predetermined bleed rate. The drop in pressure in the line 54 is later reflected as a drop in pressure in the front or reset bellows system 112 which tends to return the rod 112' toward its original position, the rate of drop depending on the setting of the needle valve 111'. The lowering of pressure in the signal pressure output line 54, as summarized below, soon results in an increase in discharge manifold pressure which produces a slight unwinding of the gauge tube 104, rocking the T-shaped member 96 clockwise and raising the ring baffle member 92 about the pivotal mounting point 93 again increasing the bleed rate and causing an increase in the signal pressure in line 54 to the speed control range within which equilibrium is usually established. Suitable gauges 115 and 116 respectively communicate with the low pressure supply line 51 and signal pressure line 54 to visually indicate control system conditions.

By way of example, assume that the engine 3 is operating with the compressor cylinders 7 and 8 thereof unloaded, four other compressor cylinders (not shown) on engine 3 being loaded, the engine 3 is running at an intermediate speed of 300 r.p.m. with a stable discharge pressure, and engine 4 is shut down. Assume further that a discharge pressure order change occurs which represents a discharge volume increase corresponding to a 30 p.s.i. increase in discharge pressure. The remote set point line 71′ is charged from a remote station with a pressure increase order corresponding to a 30 p.s.i. increase in discharge pressure. While the engine 3 is operating at 300 r.p.m., the master controller output pressure (pressure in line 54) is 11 p.s.i. Since the discharge pressure order shows an increase, the master controller output pressure will decrease from its setting of 11 p.s.i. to 9 p.s.i. which increases the speed of engine 3 to 310 r.p.m. Assuming that this change in engine speed (an infinitely variable control function) represents a discharge pressure increase of 1 p.s.i., this is not sufficient to satisfy the output pressure increase demand and, therefore, the master controller output pressure transmitted by line 54 decreases below 9 p.s.i. where relay assembly 24 reseats, loading compressor cylinder 8 of engine 3. Assuming that each compressor cylinder loading (a step control function) adds 4 p.s.i. to the discharge pressure, the increase due to the reseating of relay assembly 24 is still insufficient and, therefore, the master controller output pressure continues to decrease. At 8 p.s.i. the relay assembly 26 reseats; however, since engine 4 is not operating this has no effect on the discharge pressure. Note that engine 3 continues to run at full speed during this interval. The output pressure of the master controller continues to decrease and at 7 p.s.i. relay assembly 25 reseats, loading compressor cylinder 7 of engine 3, adding another 4 p.s.i. to the discharge pressure. Since the order still is not satisfied, the master controller output will continue to decrease to 6 p.s.i. where relay assembly 27 reseats, however, this has no effect on discharge pressure since engine 4 is not operating. Master controller output pressure continues to drop to 5 p.s.i. where relay assembly 64 reseats, causing an engagement of the start button 65 of the engine sequence starting panel 66 which starts up engine 4 (a step control function). Assuming that engine 4 has a total of six compressor cylinders (four not shown), all of which are loaded, 24 p.s.i. is added to the discharge pressure. This produces a discharge pressure increase total of 33 p.s.i. which is 3 p.s.i. excessive. The excessive discharge pressure, reflected in the gauge tube 104, causes the master controller 68 to reverse the direction of output change and thus begin raising the pressure in the signal output line 54 and continue to raise this pressure until the excessive discharge pressure is relieved. Nothing occurs until 9 p.s.i. is reached in line 54 whereupon both engines begin slowing down toward their minimum speed, 290 r.p.m., as control pressure increases from 9 to 12 p.s.i. In the illustrated example, a decrease in the speed of both engines to a rate somewhere above the minimum of 290 r.p.m. will drop the discharge pressure 3 p.s.i. which will satisfy the exact discharge pressure increase order of 30 p.s.i. whereupon the volume output requirement has been satisfied and the engines will stabilize. It is to be understood that the speed change effect must be matched with the unloading effect in any particular application. Normally speed variation in several engines is required for matching the effect of a valve lifter. If a smaller amount of unloading is involved, a correspondingly smaller total speed variation effect is needed.

As noted above whenever suction pressure reaches a value which may cause overload conditions on a particular engine a relay assembly 55 associated with that engine, in response to a signal from the suction pressure transmitter 57, either unloads a compressor cylinder or prevents that cylinder from loading in spite of a load signal from the master controller 68. This is accomplished by tripping or preventing the reseating of the compressor cylinder control relay assembly by shunting supply pressure into the respective relay assembly control line 53.

Although the above description has included two engines, one skilled in the art may easily apply the principles expressed therein to a lesser or greater number of engines, and many variations suggest themselves such as a sequential speed change in respective engines, or programming so that compressor cylinders are unloaded only on selected engines and the speed changed on other engines or any combination thereof. It is noted that a mechanical failure which prevents a speed change in an engine or a particular compressor cylinder loading will be past over by the system without disrupting subsequent sequential programming or producing error in final delivery, so long as speed variations can account for pressure changes greater than the unloading of a single compressor cylinder.

A second embodiment of this invention is illustrated in FIGS. 2 and 4 wherein overall operating principles and parts are substantially the same as those described above, however the pneumatic relay assemblies for controlling the compressor cylinder unloaders include interrelated pairs of relay devices for determining tripping and reseating pressures rather than a single relay device and associated needle valve. Referring particularly to FIG. 2, compressor cylinders 117 and 118 are controlled for unloading and loading respectively by pneumatic relay assemblies 119 and 120. The pneumatic relay assemblies 119 and 120 respectively include a pair of relay devices 121 and 122 similar to the devices 37 described above in connection with FIG. 3. The paired relationship of relay devices 121 and 122 is best illustrated in FIG. 4 wherein the master controller signal output line 123 branches at 124 with one leg 125 going directly to the control input of relay device 122 and the other leg 126 thereof going to the control input of relay device 121 through a check valve 127. A low pressure supply line 128 branches and is fed directly into the supply ports 129 of the relay devices 121 and 122 and also directly into the input port 130 of the relay device 121. The output port 131 of the relay device 121 is directly connected to the input port 132 of the relay device 122. The output port 133 of the relay device 122 is connected to a pneumatic line 134 by which the respective compressor cylinder unloader is controlled. A shunting line 135 communicates with the control line 134 and through a check valve 136 with the leg 126 downstream from the check valve 127.

In operation, assume that the pneumatic relay assembly depicted in FIG. 4 is set to trip at 12 p.s.i. and reseat at 9 p.s.i. in the signal output line 123. When the signal pressure is over 9 p.s.i. relay device 122 trips which by itself permits no pressure signal to enter the line 134 since such signal must also pass through the relay device 121 which is seated. As the pressure in the output line 123 reaches 12 p.s.i. relay device 121 trips and the supply pressure in line 128 passes through both relay devices 121 and 122 and into the control line 134 for acting on the unloading equipment to cause unloading. The pressure in line 134 also passes through the check valve 136 and locks relay device 121 in tripped position and insensitive to a dropping of the pressure in line 123 below 12 p.s.i. When, however, the pressure in line 123 drops below 9 p.s.i. the relay device 122 reseats venting the pressure in line 134 to cause compressor cylinder loading. The pressure in leg 126 slowly bleeds down permitting reseating of the relay device 121 and preparing the pneumatic relay assembly for a new cycle of operation. The principal advantages of the embodiment of FIGS. 2 and 4 are a saving in the amount of supply air required for control and greater dependability of operation; a disadvantage, however, being greater cost due to the additional relay devices required.

It is to be understood that although this invention has been described as controlling output, one skilled in the art may easily adopt same for controlling input and permitting output to vary. In some cases no speed variation in the engines is permitted in which case one skilled in the art may easily adapt this invention for controlling, in place of engine speed, a comparatively large number of small unloading devices. The large number is to minimize the step effect and thereby maintain reasonably close control.

It is to be further understood that while certain forms of this invention have been illustrated and described it is not to be limited to the specific form or arrangement of parts herein described and shown except insofar as such limitations are included in the claims.

What I claim and desire to secure by Letters Patent is:

1. An automatic control system for controlling and maintaining a desired condition of operation in a pumping station and the like having an input portion and an output portion, said station having at least one variable speed controllable engine driving a compressor including multiple cylinders with remotely operable unloaders, said system comprising:
    (a) governor means operably associated with said station and responsive to variations in a control signal within a range between upper and lower limits for varying the speed of said engine,
    (b) controlling means operably associated with said station and responsive to a first control signal value for loading one of said unloaders and responsive to a second control signal value for unloading said one unloader, and
    (c) a master controller having an order receiving member and operably connected to one of said portions for sensing condition of operation, said master controller being connected to said governor means and said controlling means, said master controller being responsive to differences between an ordered condition of operation and achieved condition of operation to direct a changing control signal to said governor means and said controlling means, said changing control signal being related in direction of change to the position above and below ordered condition of operation of achieved condition of operation,
    (d) said first and second control signal values being at opposite extremes of said variable speed control signal range for altering condition of operation to extents greater than that obtainable by varying the speed of said engine alone but using said speed variation for fine control.

2. The control system as set forth in claim 1 wherein:
    (a) said station includes automatic means for shutting down and starting up said engine,
    (b) said automatic means being operably connected with said master controller and adapted to receive said changing control signal therefrom,
    (c) said automatic means being responsive to a third and fourth control signal value for respectively shutting down and starting up said driving engine,
    (d) said third and fourth signal values respectively being at opposite extremes of a control signal range encompassing said variable speed control signal range and said first and second control signal values.

3. An automatic control system for controlling and maintaining a desired output from a pumping station and the like having an input member and an output member and at least one speed controllable engine driving a compressor including multiple cylinders with remotely operable unloaders, said system comprising:
    (a) a speed control governor on said engine, means operably connected to said speed control governor and having a member adapted to respond to signal variations within a preset range for selectively varying engine speed between fixed limits,
    (b) a relay assembly operably associated with each of said cylinder unloaders and responsive to signal variations for selectively driving said unloaders into cylinder loading and unloading positions, said unloader relay assemblies each being preset for tripping and reseating at upper and lower signal values corresponding to said unloading and loading positions, said tripping signal values for each of said unloader relay assemblies being respectively selectively different but within a tripping range, said reseating signal values for each of said unloader relay assemblies being respectively selectively different but within a reseating range, and
    (c) a master controller having input means for ordering a change in station output and output means communicating with said speed controlling member and said unloader relay assemblies, said master controller including response means cooperating with said output means to induce said output means to transmit a varying control signal to said speed controlling member and said unloader relay assemblies, said control signal being related in direction of change to the position above and below ordered station output of achieved station output,
    (d) said unloader relay assembly tripping signal value range and unloader relay assembly reseating signal value range respectively being located at opposite extremes of said speed signal value range,
    (e) whereby a changing difference between an ordered station output and attained station output produces a changing control signal which is reflected in selected sequential compressor cylinder loading and unloading, said engine speed change within said speed limits.

4. The control system as set forth in claim 3 including:
    (a) an engine shut down control operatively associated with said engine and adapted to selectively start up and shut down same, and
    (b) a relay assembly operably associated with said engine shut down control and communicating with said master controller output means and responsive to said varying control signal for selectively driving said shut down control into engine start up and shut down operation, said shut down relay assembly being preset for tripping and reseating at upper and lower signal values corresponding to said shut down and start up operation,
    (c) said latter tripping and reseating signal values being located at opposite extremes of a range encompassing said unloader tripping and reseating signal value ranges and said speed signal value range.

5. The control system as set forth in claim 3 including:
    (a) a signal transmitter communicating with the station input and adapted to transmit a signal having a value proportional to the station input, and
    (b) an engine overload relay operably connected to said transmitter and to a selected unloader relay assembly,
    (c) said overload relay being responsive to a selected transmitter signal value for overriding said selected unloader relay assembly to unload and hold unloaded the respective cylinder unloader associated with said latter unloader relay assembly during predetermined station input conditions corresponding to said selected transmitter signal value.

6. The control system as set forth in claim 3 wherein:
    (a) said varying control signal from said master controller is pneumatic pressure.

7. An automatic control system for remotely controlling and maintaining a desired discharge line pressure from a pumping station and the like independently of suction line pressure, said station having a plurality of speed controllable engines driving a plurality of compressors respectively including multiple cylinders with remotely operable unloaders, said system comprising:

(a) a speed control governor on each of said engines, a motor means operably connected to each of said speed control governors and having a positioning member adapted to respond to inverse signal pressure variations only within a preset range for varying engine speed between fixed limits representing a characteristically efficient engine speed range, (b) a pneumatic relay assembly operably associated with each of said cylinder unloaders and responsive to signal pressure variations for driving said unloaders into cylinder loading and unloading positions, said unloader relay assemblies each being preset for tripping and reseating at fixed upper and lower signal pressures respectively corresponding to said unloading and loading positions, said tripping signal pressures for each of said unloader relay assemblies being respectively sequentially different but within a tripping range, said reseating signal pressures for each of said unloader relay assemblies being respectively sequentially different but within a reseating range, (c) an engine shut down control operably associated with selected engines and adapted to selectively start up and shut down same, a pneumatic relay assembly operably associated with each of said engine shut down controls and responsive to signal pressures for driving same into engine start up and shut down operation, said shut down relay assemblies each being preset for tripping and reseating at upper and lower signal pressures respectively corresponding to said shut down and start up operation, said tripping signal pressures for each of said shut down relay assemblies being respectively sequentially different but within a tripping range, said reseating signal pressures for each of said shut down relay assemblies being respectively sequentially different but within a reseating range, and (d) a master controller having a pneumatic bleed nozzle and nozzle baffle movable with respect to each other for controlling bleed rates from said nozzle, said master controller including remote setting features adapted to adjustably move said baffle for ordering a desired station discharge line pressure, said master controller including a pressure sensitive member communicating with and responsive to station discharge line pressure to adjustably move said baffle, a pressure sensitive device operably connected to said bleed nozzle, said pressure sensitive device being responsive to bleed rate from said nozzle for adjustably moving said nozzle, said latter pressure sensitive device communicating with said speed control positioning members and said pneumatic relay assemblies and said engine shut down controls for delivering a varying signal pressure thereto, (e) said unloader tripping signal pressure range and unloader reseating signal pressure range respectively being located at opposite extremes of said speed signal pressure range, said shut down assembly tripping signal pressure range and shut down assembly reseating pressure range being located at opposite extremes of a range encompassing said unloader signal pressure ranges and said speed signal pressure range, (f) whereby the changing difference between a desired discharge line pressure and attained discharge line pressure produces a changing signal pressure in said latter pressure sensitive device which is reflected in selected sequential engine start up and shut down operation, selected sequential compressor cylinder loading and unloading, and engine speed change within an efficient engine speed range.

References Cited by the Examiner

UNITED STATES PATENTS

| | | | |
|---|---|---|---|
| 2,432,553 | 12/1947 | Zilly | 230—2 |
| 2,733,660 | 2/1956 | Towle | 103—23 |
| 2,791,179 | 5/1957 | Dover | 103—23 |
| 2,922,372 | 1/1960 | Dover | 103—35 |
| 3,024,964 | 3/1962 | Emmel | 230—4 |
| 3,088,655 | 5/1963 | Miller | 230—2 |
| 3,096,926 | 7/1963 | Koch | 230—4 |
| 3,160,101 | 12/1964 | Bartoseski | 103—11 |

LAURENCE V. EFNER, *Primary Examiner.*